United States Patent Office 3,350,785
Patented Nov. 7, 1967

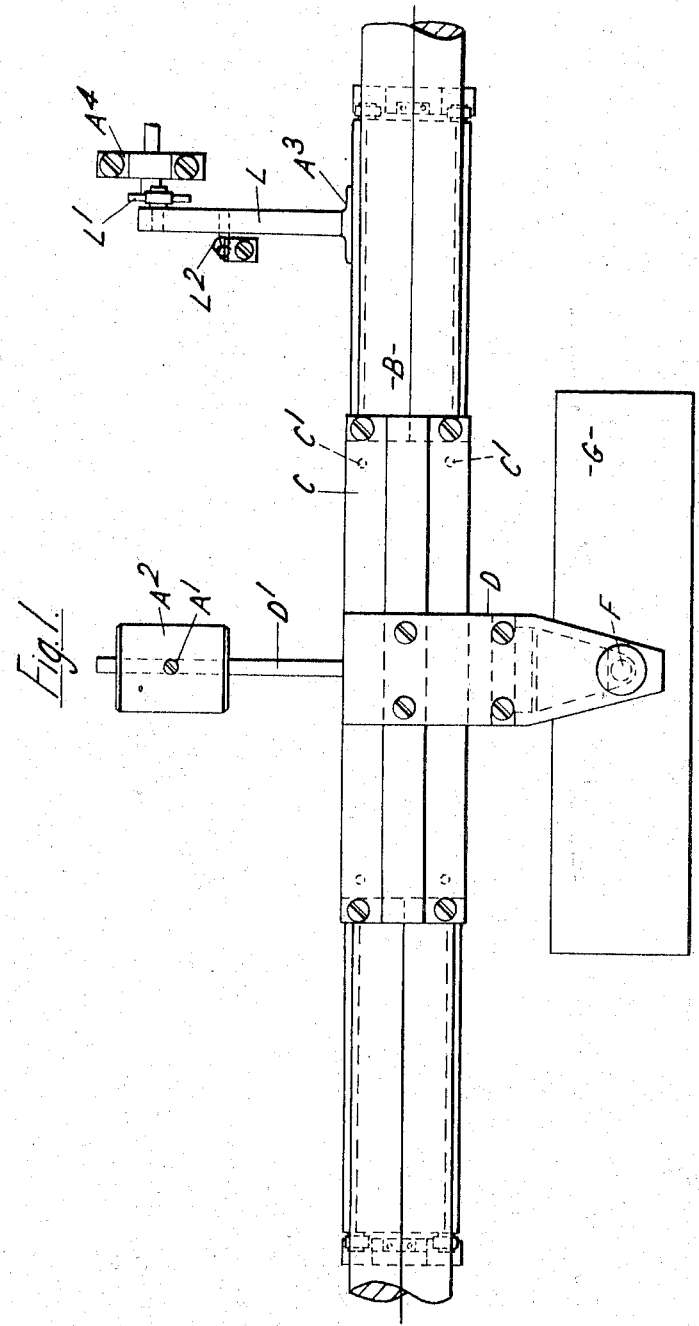
Nov. 7, 1967 — G. O. RAWSTRON ETAL — 3,350,785
APPARATUS FOR TESTING THE DIAMETER OF A CYLINDRICAL SURFACE
Filed May 28, 1965 — 6 Sheets-Sheet 1
Inventors
G. O. Rawstron
M. J. Foster
Attorneys

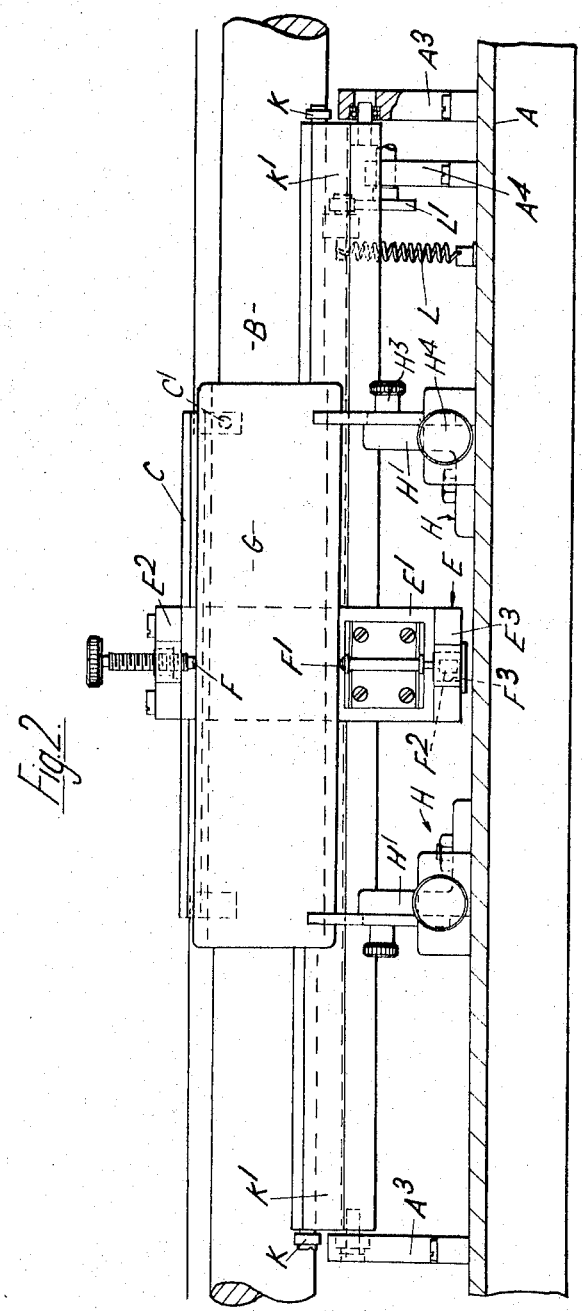

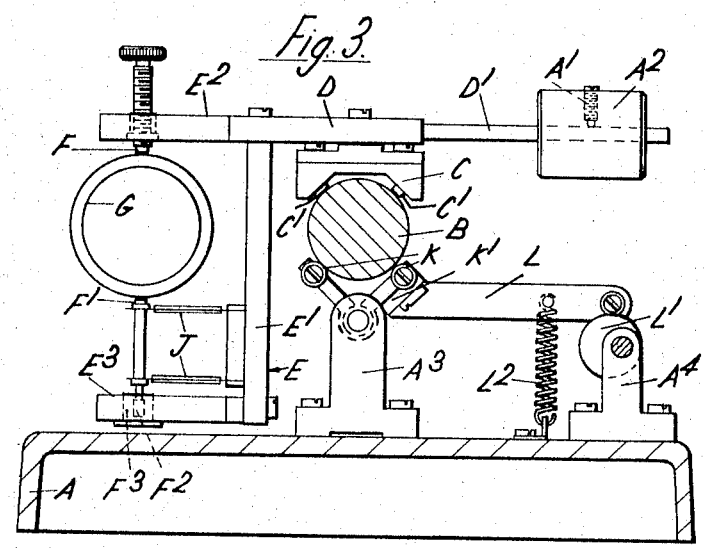
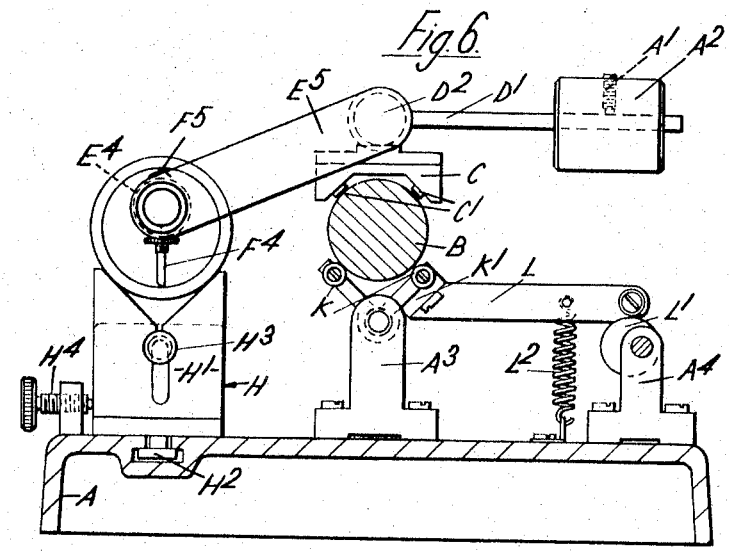

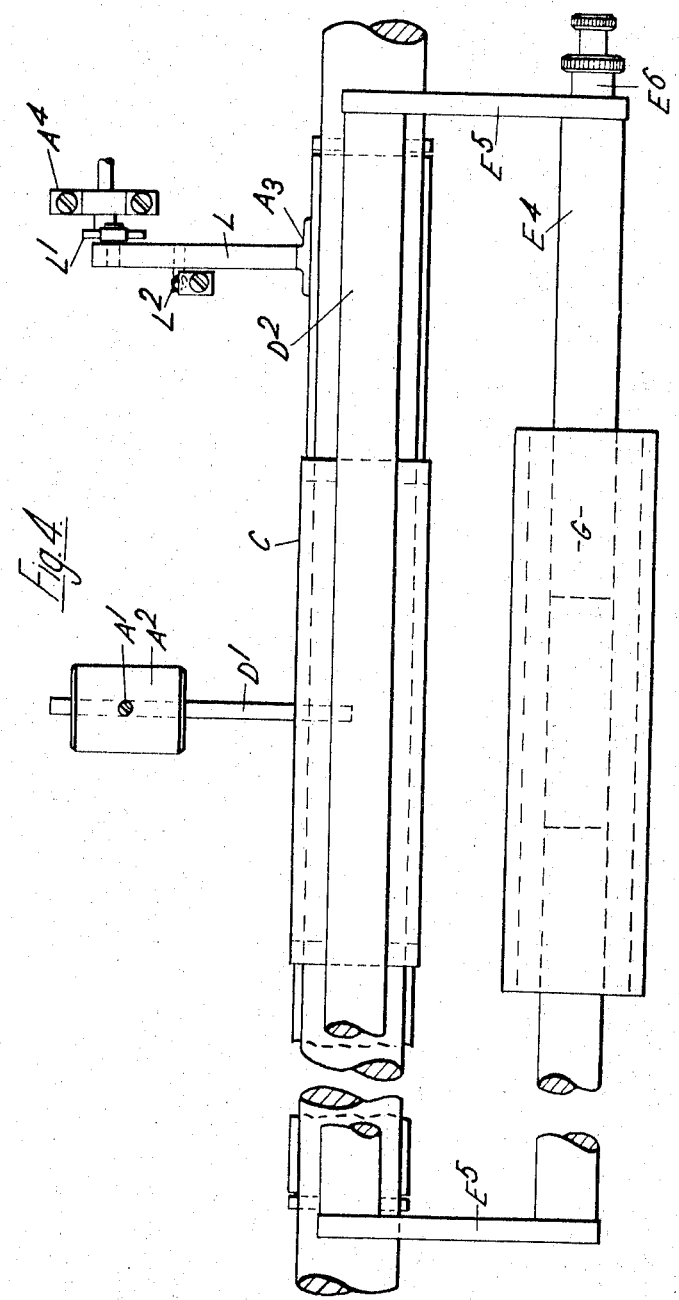

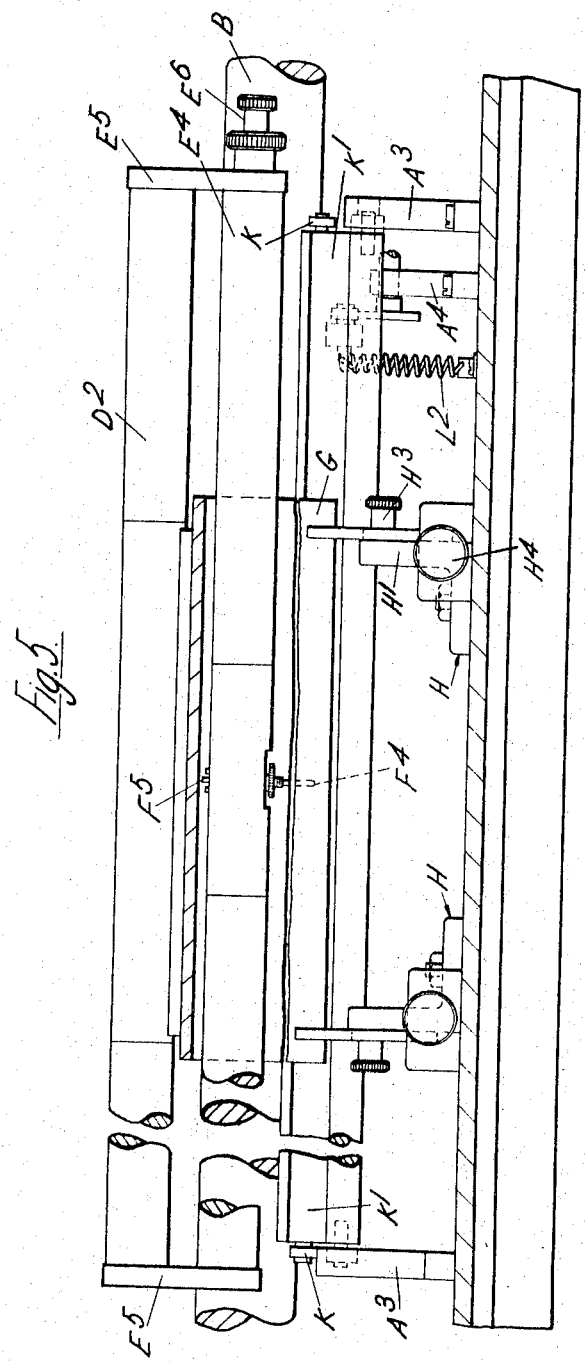

3,350,785
APPARATUS FOR TESTING THE DIAMETER OF A CYLINDRICAL SURFACE
George Omerod Rawstron, Desford, and Michael John Foster, Melton Mowbray, England, assignors to The Rank Organisation Limited, London, England, a British company
Filed May 28, 1965, Ser. No. 459,747
Claims priority, application Great Britain, May 28, 1964, 22,090/64
13 Claims. (Cl. 33—178)

ABSTRACT OF THE DISCLOSURE

This invention relates to apparatus for testing a cylindrical surface for variation in its diameter along its length wherein a carriage is movable along a guide to cause two opposed feelers simultaneously to traverse diametrically opposite paths on the test surface and testing means are provided for testing that the feeler engage the test surface throughout traversing at diametrically opposite points thereof.

---

Figure 7:
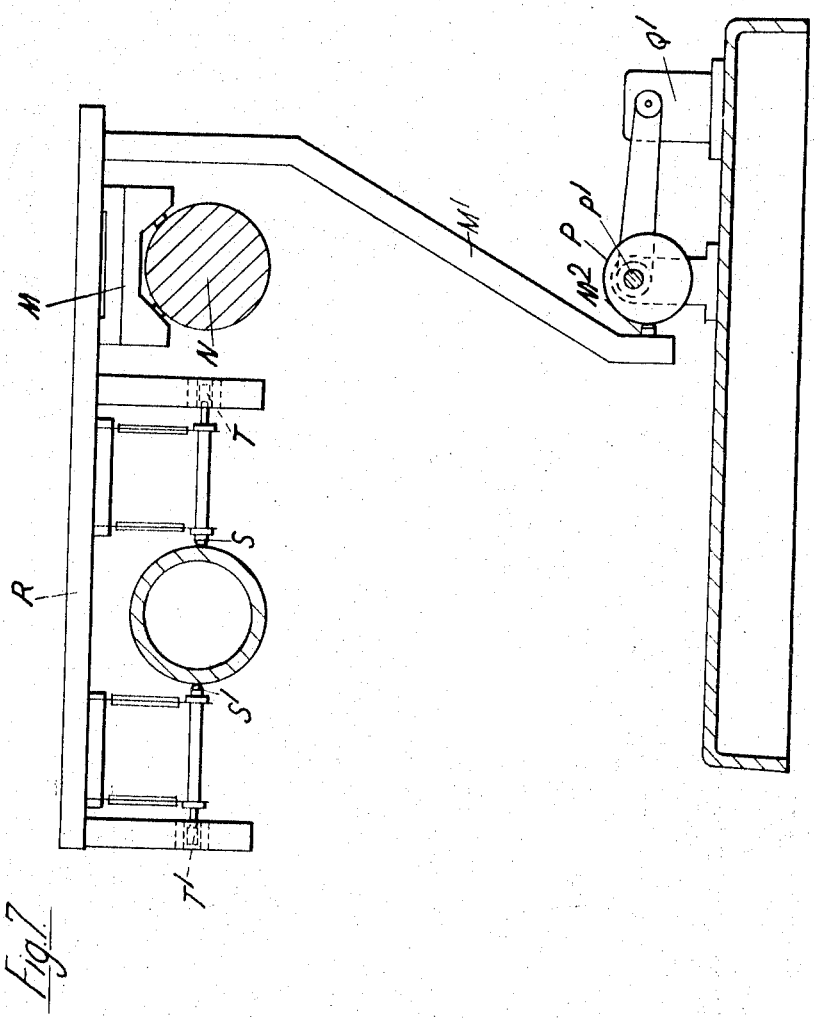

This invention relates to apparatus for testing the diameter of a cylindrical surface, internal or external, and more particularly to apparatus for measuring or indicating variation in the diameter of a cylindrical surface along the length thereof.

Gauging devices are know for continuously indicating variation in thickness of strip material, the device having a pair of gauging tips between which the strip material is fed. Also known are gauging devices, for example a caliper gauge, which can be employed to measure the diameter of a cylindrical surface at a chosen position along the length thereof.

An object of the present invention is to provide apparatus for measuring or indicating variation in diameter along the length of a cylindrical surface. In such apparatus, an accurate measurement or indication can only be obtained provided that the gauging tips engage the test surface, at every position throughout the test length, at opposite ends of a diameter of such test surface, and a further object of the invention is to provide the test apparatus with means enabling such accurate measurement or indication to be ensured.

The apparatus according to the present invention, for measuring or indicating variation in the diameter of a cylindrical test surface on a work piece along the length thereof, comprises an at least approximately straight guide a workpiece support for positioning the workpiece with the axis of said surface generally parallel to said guide, a carriage mounted for traversing movement along such guide, a pair of oppositely directed feelers carried by such carriage and for simultaneous engagement with diametrically opposite points of the test surface throughout traversing, whereby such feelers simultaneously traverse diametrically opposite paths along such test surface, at least one of the feelers being mounted for movement relative to the carriage in a plane generally through the axis of the test surface, whereby the distance between the operative tips of the feelers varies during traversing in accordance with variation in the diameter of the test surface along the length thereof, detecting means responsive during traversing to the variation in the distance between the operative tips of the feelers and for operating a measuring or indicating instrument, and testing means operable at will for imparting a reciprocating motion to the carriage, generally in a direction transverse to the direction of traversing and to the line between the feelers, to test that the two feelers will, when the testing means is rendered inoperative, engage the test surface throughout traversing at diametrically opposite points on such surface.

The testing means is preferably such that it can be rendered operative during traversing.

The apparatus may conveniently be provided with means for adjusting the position of and workpiece support relative to the guide for the feeler carriage. Thus, this adjustment may conveniently be effected while the testing means is operative, in accordance with the measurement or indication obtained at the final instrument, so that the workpiece is precisely located in the correct position which ensures that the two feelers will, when the testing means is rendered inoperative, engage the test surface throughout traversing at diametrically opposite points thereon.

For example, a convenient form of final instrument is an electrical pen recorder, so that when the testing means is operative during traversing a trace is obtained which appears as a cylindrical waveform alternating between maxima and minima, in accordance with the changing distance between the operative tips of the feelers, as the reciprocation of the feeler supporting carriage in the direction transverse to the traversing direction takes place. The frequency of repetition in the waveform is in fact the frequency of reciprocation, but if the workpiece is in the correct position, so that approximately midway through each stroke of each complete cycle of reciprocation the two feelers are engaging the test surface at diametrically opposite points thereon, the frequency of the trace becomes double the frequency of such reciprocation. This is because the distance between the operative tips of the feelers increases from a minimum to a maximum and then again falls to a minimum during each stroke. However, if the position of the workpiece is not correct, so that the feelers do not at any point of each reciprocating cycle engage at the ends of a diameter of the test surface, then the distance between the operative tips of the feelers increases to a maximum during one stroke of each cycle and decreases to a minimum during the following stroke whereby the frequency of the traced waveform is equal to the frequency of reciprocation. Clearly also, the amplitude of the cyclical waveform is greater when the workpiece is not correctly positioned than when it is correctly positioned.

Thus, in setting up the apparatus for testing, the position of the workpiece is adjusted, for example by utilising the above-mentioned means for indicating the desired adjustment of the workpiece support, so that throughout traversing an apparently double frequency waveform of small amplitude is obtained. If, while traversing with the testing means operative, the trace breaks into the double frequency small amplitude waveform part of the way along the test length, this indicates that the workpiece is not parallel to the guide along which the feeler carriage is moving, and adjustment must be made accordingly.

It should be made clear that, in the above described apparatus, the feelers have relatively rounded operative tips so as not to be responsive to surface roughness.

In one convenient arrangement, the guide comprised an at least generally straight shaft and the feeler carriage is guided for axial movement on such shaft by means of a V-bearing defined by axially spaced pairs of angularly spaced bearing elements on such carriage. In this arrangement the testing means may conveniently be constituted by means for imparting a rocking motion to the guide shaft about an axis generally contained in the bisecting plane of the V-bearing of the feeler carriage and lying parallel to the axis of the guide shaft. For example, the rocking motion may be applied to the guide shaft by means acting to impart a rocking motion to an extended V-support for such guide shaft.

Alternatively, in the above-described arrangement employing a guide shaft, a supplementary guide lying generally in the bisecting plane of the V-bearing of the feeler carriage may be employed, whilst the testing means may conveniently be constituted by means for imparting a reciprocating motion to such supplementary guide generally in the direction normal to the bisecting plane of the V-bearing of the feeler carriage, thereby to effect a rotational reciprocating motion of the carriage relative to the guide shaft.

In a preferred arrangement, one feeler is fixedly mounted on a carriage, such carriage being biased relatively to the guide to maintain engagement of such feeler with the test surface, whilst the second feeler is movably mounted on the carriage, and biased relatively thereto to maintain engagement with the test surface, the detecting means being responsive during traversing to the movement of the second feeler towards and away from the first feeler.

In an alternative arrangement, the two feelers are each movably mounted on the carriage and biassed relatively thereto to maintain engagement with the test surface, the detecting means being responsive during traversing to the difference in the movement of such two feelers towards and away from each other.

In the above described arrangements employing a guide shaft, the workpiece support, when properly adjusted, preferably acts to locate the workpiece so that the axis of such workpiece lies in a plane normal to bisecting plane of the V-bearing of the carriage and intersecting such bisecting plane generally at the axis of the guide shaft. In the arrangement in which the guide shaft is rocked for testing, the two feelers are preferably mounted on the carriage to lie on a line generally parallel to the bisecting plane of the V-bearing of such carriage, whilst in the arrangement in which the supplementary guide is rocked for testing, such feelers are preferably mounted to lie in a plane at right angles to such bisecting plane of the V-bearing. The workpiece support is preferably formed in two independently adjustable parts spaced apart in the direction of traversing.

The invention may be carried into practice in various ways but a preferred practical arrangement of testing apparatus according thereto will now be described by way of example with reference to the accompanying drawings, in which:

FIGURE 1 is a plane view of the arrangement, set up for testing an external cylindrical surface, FIGURE 2 is a front elevational view of the arrangement, FIGURE 3 is a transverse sectional view of the arrangement, FIGURE 4 shows in plan view a modified arrangement, for testing an internal cylindrical surface, FIGURES 5 and 6 are views of the modified arrangement corresponding to FIGURES 2 and 3, and FIGURE 7 is an alternative arrangement, as shown for testing an external cylindrical surface, in transverse section.

In the following description, the referred to casing of the apparatus is for the most part not shown in the drawings for reasons of clarity.

The arrangement comprises an elongated casing, of which the supporting base A is shown in FIGURES 2 and 3, wherein is mounted by means later described a generally horizontal shaft B extending from one end of the casing to the other. This shaft B is at least generally straight, but it is not essential for it to have an accurately straight axis or to have an accurately uniform diameter along its length. Mounted to move along such shaft, either by hand or alternatively by a not shown motor drive, is a carriage C in the form of a member which straddles the upper surface of shaft B over a portion of the length thereof and has on its underside two longitudinally spaced pairs of angularly spaced bearing pads $C^1$, the pads of each pair resting on the shaft at the ends of radii lying at equal angles to the vertical on opposite sides thereof. The carriage C is thus in effect supported on an axially extended V-bearing having a generally vertical bisecting plane.

Detachably secured to the carriage C is a member D which extends forwardly through an end-to-end slot in the front wall of the not shown casing, such member carrying a frame generally indicated at E, in turn carrying a pair of feelers, F and $F^1$ with operative tips of relatively large radius, for engagement with the surface of the workpiece G to be tested. As is shown for clarity in FIGURE 2 only, workpiece G is mounted between its ends on a two part adjustable work support indicated generally at H, on the base A of the casing, so that the axis of the cylindrical surface to be tested extends generally horizontally strictly parallel to the above-described guide shaft B at a preset distance therefrom. Each part of the work-support H, which also appears in FIGURES 5 and 6 later described, comprises a V-block $H^1$ detachably secured to the base A by an attachment screw $H^2$, together with adjustment screws $H^3$ and $H^4$ by means of which the block can be moved relative to the base, and thus relative to the guide shaft B, respectively in the vertical direction and in the horizontal direction at right angles to the traversing direction. The manner in which the workpiece G is accurately located in this position will be later described.

For testing an external cylindrical surface, the feeler supporting frame shown in FIGURES 1 and 3 comprises a vertical arm $E^1$ which extends downwardly from the frame supporting member D behind the workpiece G, and two horizontal arms $E^2$ and $E^3$ extending forwardly from such vertical arm respectively just above and some distance below the workpiece. Mounted in the upper horizontal arm $E^2$ of the frame is an abutment feeler whose operative tip projects below such arm to engage the surface to be tested at the upper end of a vertical diameter thereof, just above the lower horizontal arm of the frame $E^3$ a measuring feeler $F^1$ is supported at the front ends of a pair of generally horizontal vertically spaced spring ligaments J extending forwardly from the vertical arm $E^1$ of the frame, to which the rear ends of such ligaments are secured, such measuring feeler having an upwardly directed operative tip for engagement with the surface to be tested at the lower end of the vertical diameter thereof. Due to the weight of the frame E, the supporting carriage C therefor is biassed about the guide shaft B under gravity to maintain the abutment feeler F in engagement with the surface to be tested when traversing is effected by moving the carriage along such guide shaft. A counterweight, in the form of an arm $D^1$ projecting rearwardly from the carriage C, and associated with a limiting stop $A^1$ fixed to a portion $A^2$ of the casing is provided to ensure that the abutment feeler F is urged into engagement with the test surface with a suitable light force. The supporting ligaments J for the measuring feeler $F^1$ are preferably each formed with an inherent set so as to urge such measuring feeler into engagement with the test surface with a suitable light force, but alternatively a conventional spring acting between the feeler and the frame may be employed for this purpose. The lower end of the measuring feeler $F^1$ carries the moving element $F^2$ of an electrical detector of which the stator $F^3$ is mounted on the lower horizontal arm $E^3$ of the frame, so that such stator is also located on the generally vertical line in which the feeler F and $F^1$ are mounted.

In use of the above-described arrangement, with the workpiece G properly positioned, the two feelers F and $F^1$ respectively traverse diametrically opposite paths along the test surface when the carriage C is moved along the guide shaft B. During traversing the movement of the measuring feeler $F^1$ relative to the carriage C, in the vertical direction generally normal to the traversing direction, gives rise to an output signal from the detector $F^2$, $F^3$ which is amplified in a conventional manner and fed to an electrical pen recorder of the usual kind. Since the movement of the carriage C in the same direction, and more particularly the movement of the stator $F^3$ of the detector carried thereby, is determined by the movement of the abutment feeler F in such direction, the signal output of the detector $F^2$, $F^3$ is a true measure of variation in the diameter of the test surface along the length thereof. Furthermore, as the datum for the working movement of the measuring feeler $F^1$ is constituted by the locus of the abutment feeler F, small inaccuracies in straightness and slight variation in diameter of the guide shaft B do not effect the accuracy of the final trace obtained at the pen recorder. However, in this connection it is to be appreciated that, in the above-described arrangement employing an abutment feeler F fixedly mounted relative to the carriage C, the mounting of the feelers F and $F^1$ on a line parallel to the bisecting plane of the V-bearing support for the feeler carriage C, to engage diametrically opposite points of the cylindrical test surface when this is positioned with its axis level with the axis of the guide shaft B, is also important for the avoidance of error.

As previously mentioned, the proper positioning of the workpiece G, relative to the guide B along which the feeler carriage C moves, is also essential to the accuracy of the measurement. It must be ensured that the feelers F and $F^1$ engage, throughout the traversing range, at diametrically opposite points of the test surface. The means for testing whether or not this condition is fulfilled will now be described.

Such testing means comprises an axially extended V-support for the guide shaft, comprising two or more axially spaced pairs of angularly spaced support elements K on a V-shaped base $K^1$ having a bisecting plane through the axis of the guide shaft B and therefore generally coplanar with the bisecting plane of the V-bearing of the feeler carriage C, together with means for pivotally rocking such V-support K, $K^1$, relative to brackets $A^3$ on the casing base A, about a horizontal axis through the apex of such support parallel to the axis of the guide shaft B. Such rocking means comprises an arm L rigidly attached to the V-support base $K^1$ and extending rearwardly therefrom to bear against an eccentric cam $L^1$, driven by a not shown motor, with which the rear end of the arm L is maintained in engagement by means of a spring $L^2$. When the motor is operated to rotate the eccentric cam $L^1$, which is mounted to undergo its eccentric rotation relative to a second bracket $A^4$ on the casing base A, the V-support is caused to rock forwards and backwards about its pivotal mounting, thereby causing a similar forwards and backwards reciprocation of the feeler carriage C and the feeler frame E carried thereby. Thus, the two feelers F and $F^1$ are reciprocated across the test surface, in a direction generally normal to the length of such test surface.

The testing means is operated during traversing, and the position of the workpiece G is adjusted by the two part work-support H in accordance with the appearance of the trace at the pen recorder. Thus, first assuming that the workpiece G is wholly incorrectly spaced from the guide shaft B, the final trace appears as a cyclical waveform of substantial amplitude whose frequency is equal to the frequency of reciprocation. This is because the feelers F and $F^1$ do not at any point of each cycle of reciprocation engage at the ends of a diameter of the test surface, so that throughout one stroke of each cycle the spacing between the feelers increases to a maximum and throughout the next stroke decreases to a minimum. If now the two parts of the adjustable work-support H are adjusted to move the workpiece G nearer to or further from the guide shaft B, whichever is appropriate as can be seen by eye, so that the feelers F and $F^1$ are caused to cross a diameter of the workpiece approximately midway through each stroke of each reciprocating cycle, then the frequency of the final trace appears to be doubled whilst its amplitude is reduced. This is because during each cycle or reciprocation, the spacing between the feelers F and $F^1$ increases to a maximum twice, approximately midway through each stroke. In practice, the two parts of the work-support H, respectively at or near opposite ends of the workpiece G, are alternately adjusted repeatedly in order to achieve the apparently double frequency trace of small amplitude throughout the test length.

The workpiece G having been correctly positioned in the above-described manner, the testing means is rendered inoperative, means such for example as a spring detent (not shown) being provided for ensuring that the motor driven cam $L^1$ is appropriately brought to rest with the guide shaft B in the mean position corresponding to the mid-point of a reciprocating stroke, and traversing is effected to measure variation in the diameter of the test surface. The proper positioning of the workpiece G by use of the above-described testing means ensures that the two feelers F and $F^1$ engage the test surface along diametrically opposite paths thereon throughout the measuring traverse. Lack of straightness of the final trace, obtained as a result of the measuring traverse, is a true measure of variation in the diameter of the test surface.

To cater for workpiece for differing sizes, the abutment feeler F is as shown preferably mounted in the upper horizontal arm $E^2$ of the feeler supporting frame E to be adjustable in the vertical direction. In addition, since the member D supporting the feeler supporting frame E is detachable from the carriage C on which it is mounted, an alternative frame may be mounted in position on such carriage to enable interior cylindrical surfaces to be tested. FIGURES 4, 5 and 6 show the apparatus modified by the substitution of an alternative frame for this purpose.

Such alternative frame comprises a bar in the form of a tube $E^4$ for extending through the hollow workpiece G to be tested, a pair of arms $E^5$ projecting through the front wall of the casing to support such bar at its ends, the connection between at least one of such arms and the bar being in the form of a detachable coupling as indicated at $E^6$ in FIGURES 4 and 5. A crosspiece $D^2$ carries the arms and can be detachably mounted on the carriage C. The two feelers $F^4$ and $F^5$ are carried by the bar $E^4$ extending through the workpiece G, the abutment feeler $F^5$ being directly mounted on such bar and the measuring feeler $F^5$ being flexibly mounted for movement towards and away from the abutment feeler to operate a detector (not shown) of which the stator is fixed relative to the bar. As before, the two feelers $F^4$ and $F^5$ and the stator of the detector are mounted on a vertical line so that the two feelers engage throughout traversing the ends of a diameter of the interior cylindrical test surface, when correct positioning of the workpiece G has been effected by use of the testing means in the same manner as that previously described. While the abutment feeler remains fixed in position relative to the bar $E^4$ during use, the mounting thereof is as before adjustable to cater for workpieces of differing sizes Other reference letters employed in FIGURES 4 to 6 are for parts identical with those in FIGURES 1 to 3.

It will be appreciated that the above-described arrangement may be modified in various ways within the scope of the invention. For example, the testing means may alternatively be constituted by means for rocking the feeler carriage relative to the guide shaft on which such carriage is mounted, such guide shaft being fixedly mounted within the casing. One arrangement of this kind employing an at least generally straight guide shaft is shown in FIGURE 7, the feeler carriage M being movably mounted on such shaft N by means of an axially extended V-bearing whilst below such main guide shaft a supplementary guide shaft P is mounted in the casing. The carriage M has fixed to it an arm $M^1$ which extends downwardly behind the main guide shaft to carry at or near its lower end a runner $M^2$ for engagement with the supplementary guide shaft P. Due to this runner $M^2$ bearing against the supplementary guide shaft, the carriage M is normally held against rotation about the main guide shaft N. However, the supplementary guide shaft P is mounted between its ends to rotate about an eccentric axis $P^1$ parallel to its length, such eccentric rotation being brought about when required by suitable means, for example as shown by a pulley driven by an electric motor $Q^1$. The eccentric rotation of the supplementary guide shaft P brings about a forwards and backwards reciprocating movement of the feeler carriage M and frame R carried thereby about the main guide shaft N. With the alternative arrangement of FIGURE 7, the abutment feeler $S^1$ must be flexibly mounted on the carriage frame R in like manner to the measuring feeler S. Thus two detectors T and $T^1$ are employed, the outputs of which are taken differently to provide a signal for operating the final instrument. It is also to be noted that, in this alternative arrangement, the two feelers S and $S^1$ are mounted on the frame R to lie in a plane normal to the bisecting plane of the V-bearing support for the carriage M.

The frame R is again made detachable from the carriage M to permit substitution of a frame carrying feelers mounted to permit testing of an internal cylindrical surface.

It will be appreciated that it is not essential to use of the described arrangements to effect traversing of the feeler carriage whilst operating the testing means. Thus adjustment of the position of the workpiece may be carried out by rendering the testing means operative whilst the carriage is stationary, alternatively at two spaced positions in the range of traverse.

What we claim as our invention and desire to secure by Letters Patent is:

1. Apparatus for measuring or indicating variation in the diameter of a cylindrical test surface on a workpiece along the length thereof, comprising an at least generally straight guide, a workpiece support for positioning the workpiece with the axis of said surface generally parallel to said guide, a carriage mounted for traversing movement along such guide, a pair of oppositely directed feelers carried by such carriage and for simultaneous engagement with diametrically opposite points of the test surface throughout traversing, whereby such feelers simultaneously traverse diametrically opposite paths along such test surface, at least one of the feelers being mounted for movement relative to the carriage in a plane generally through the axis of the test surface, whereby the distance between the operative tips of the feelers varies during traversing in accordance with variation in diameter of the test surface along the length thereof, detecting means responsive during traversing to the variation in the distance between the operative tips of the feelers and for operating a measuring or indicating instrument, and testing means operable at will for imparting a reciprocating motion to the carriage, generally in a direction transverse to the direction of traversing and to the line between the feelers, to test that the feelers will, when the testing means is rendered inoperative, engage the test surface throughout traversing at diametrically opposite points on such surface.

2. Measuring or indicating apparatus as claimed in claim 1 in which the guide comprises an at least generally straight shaft and the feeler carriage is guided for axial movement on such shaft by means of a V-bearing defined by axially spaced pairs of angularly spaced bearing elements on such carriage.

3. Measuring or indicating apparatus as claimed in claim 2, in which the testing means is constituted by means for imparting a rocking motion to the guide shaft about an axis generally contained in the bisecting plane of the V-bearing of the feeler carriage and lying parallel to the axis of the guide shaft.

4. Measuring or indicating apparatus as claimed in claim 3, in which the rocking motion is applied to the guide shaft by means acting to impart a rocking motion to an extended V-support for such guide shaft.

5. Measuring or indicating apparatus as claimed in claim 4, in which one feeler is fixedly mounted on the carriage, such carriage being biassed relatively to the guide to maintain engagement of such feeler with the test surface, whilst the second feeler is movably mounted on the carriage, and biased relatively thereto to maintain engagement with the test surface, the detecting means being responsive during traversing to the movement of the second feeler towards and away from the first feeler.

6. Measuring or indicating apparatus as claimed in claim 5 including means for adjusting the position of the workpiece support relative to the guide for the feeler carriage, to ensure that the two feelers will, when the testing means is rendered inoperative, engage the test surface throughout traversing at diametrically opposite points thereon.

7. Measuring or indicating apparatus as claimed in claim 6, in which the workpiece support, when properly adjusted, acts to locate the workpiece so that the axis of such workpiece lies in a plane normal to bisecting plane of the V-bearing of the carriage and intersecting such bisecting plane generally at the axis of the guide shaft.

8. Measuring or indicating apparatus as claimed in claim 7, in which the workpiece support is formed in two independently adjustable parts spaced apart in the direction of traversing.

9. Measuring or indicating apparatus as claimed in claim 8, in which the two feelers are mounted on the carriage to lie on a line generally parallel to the bisecting plane of the V-bearing of such carriage.

10. Measuring or indicating apparatus as claimed in claim 2, in which a supplementary guide lies generally in the bisecting plane of the V-bearing of the feeler carriage, and the testing means is constituted by means for imparting a reciprocating motion to such supplementary guide generally in the direction normal to the bisecting plane of the V-bearing of the feeler carriage, thereby to effect a rotational reciprocating motion of the carriage relative to the guide shaft.

11. Measuring or indicating apparatus as claimed in claim 1, in which the two feelers are each movably mounted on the carriage and biassed relatively thereto to maintain engagement with the test surface, the detecting means being responsive during traversing to the difference in the movements of such two feelers towards and away from each other.

12. Measuring or indicating as claimed in claim 1, including means for adjusting the position in the workpiece support relative to the guide for the feeler carriage, to ensure that the two feelers will, when the testing means is rendered inoperative, engage the test surface throughout traversing at diametrically opposite points thereon.

13. Measuring or indicating apparatus as claimed in claim 1, in which one feeler is fixedly mounted on the carriage, such carriage being biassed relatively to the guide to maintain engagement of such feeler with the test surface, whilst the second feeler is movably mounted on the carriage, and biased relatively thereto to maintain engagement with the test surface, the detecting means being responsive during traversing to the movement of the second feeler towards and away from the first feeler.

References Cited

UNITED STATES PATENTS

| 2,648,912 | 8/1953 | Osgood | 33—174 |
| 2,930,283 | 3/1960 | Smith et al. | 33—174 |
| 3,208,151 | 9/1965 | Rawstron | 33—174 |

FOREIGN PATENTS

| 1,038,696 | 5/1953 | France. |

SAMUEL S. MATTHEWS, *Primary Examiner.*